(12) United States Patent
Hadder

(10) Patent No.: US 7,219,498 B2
(45) Date of Patent: May 22, 2007

(54) WAFFLED IMPINGEMENT EFFUSION METHOD

(75) Inventor: James L. Hadder, Scottsdale, AZ (US)

(73) Assignee: Honeywell International, Inc., Morristown, NJ (US)

(*) Notice: Subject to any disclaimer, the term of this patent is extended or adjusted under 35 U.S.C. 154(b) by 203 days.

(21) Appl. No.: 10/938,805

(22) Filed: Sep. 10, 2004

(65) Prior Publication Data

US 2006/0053798 A1 Mar. 16, 2006

(51) Int. Cl.
*F02C 1/00* (2006.01)
*F02G 3/00* (2006.01)

(52) U.S. Cl. .......................... 60/752; 60/772

(58) Field of Classification Search .......... 60/752–760, 60/772, 806
See application file for complete search history.

(56) References Cited

U.S. PATENT DOCUMENTS

| | | | | |
|---|---|---|---|---|
| 3,349,558 A * | 10/1967 | Smith | .................... | 60/754 |
| 3,705,492 A * | 12/1972 | Vickers | .................... | 60/39.511 |
| 3,854,285 A * | 12/1974 | Stenger et al. | ................ | 60/756 |
| 4,008,568 A * | 2/1977 | Spears et al. | ................. | 60/796 |
| 4,269,032 A | 5/1981 | Meginnis et al. | | |
| 4,312,186 A | 1/1982 | Reider | | |
| 4,628,694 A | 12/1986 | Kelm et al. | | |
| 4,695,247 A | 9/1987 | Enzaki et al. | | |
| 4,702,073 A * | 10/1987 | Melconian | ............... | 60/39.464 |
| 4,800,718 A * | 1/1989 | Zimmerman | ................ | 60/264 |
| 4,887,663 A | 12/1989 | Auxier et al. | | |
| 5,216,886 A | 6/1993 | Ewing | | |
| 5,363,643 A * | 11/1994 | Halila | ........................ | 60/796 |
| 5,435,139 A | 7/1995 | Pidcock et al. | | |
| 5,598,697 A | 2/1997 | Ambrogi et al. | | |
| 5,737,922 A * | 4/1998 | Schoenman et al. | .......... | 60/752 |
| 5,782,294 A | 7/1998 | Froemming et al. | | |
| 6,164,075 A * | 12/2000 | Igarashi et al. | ............... | 60/752 |
| 6,173,561 B1 * | 1/2001 | Sato et al. | .................... | 60/772 |
| 6,237,344 B1 | 5/2001 | Lee | | |
| 6,530,225 B1 | 3/2003 | Hadder | | |
| 6,761,031 B2 * | 7/2004 | Bunker | ........................ | 60/752 |
| 6,826,913 B2 * | 12/2004 | Wright | ........................ | 60/772 |
| 6,837,050 B2 * | 1/2005 | Mandai et al. | ................. | 60/725 |
| 6,981,358 B2 * | 1/2006 | Bellucci | ...................... | 60/39.17 |
| 2002/0152751 A1 | 10/2002 | Mandai et al. | ................. | 60/746 |
| 2005/0022531 A1 * | 2/2005 | Burd | ............................ | 60/752 |
| 2005/0097890 A1 * | 5/2005 | Ikeda et al. | .................... | 60/748 |
| 2005/0166596 A1 * | 8/2005 | Sattinger | ...................... | 60/772 |
| 2006/0005543 A1 * | 1/2006 | Burd | ............................ | 60/752 |
| 2006/0042257 A1 * | 3/2006 | Stastny | ......................... | 60/772 |

* cited by examiner

*Primary Examiner*—William H. Rodriguez
(74) *Attorney, Agent, or Firm*—Ingrassia Fisher & Lorenz (57) ABSTRACT

A combined impingement effusion method comprises brazing or welding a waffled impingement plate to the cold back-side surface of component having effusion holes there through. The impingement plate comprises a plurality of small baffle cells to relieve the thermal stresses between the impingement plate and the component. By rigidly attaching the impingement plate, the cooling flow leakage associated with the seals of floating plates is avoided.

31 Claims, 5 Drawing Sheets

WAFFLED IMPINGEMENT EFFUSION METHOD

BACKGROUND OF THE INVENTION

The present invention generally relates to gas turbine engines and, more particularly, to cooled components, such as combustor liners.

Customers and regulation agencies are continually applying pressure on engine manufactures to achieve lower specific fuel consumptions (SFCs) and emissions. This in turn requires combustors to operate at hotter temperatures yet reduce the cooling air required to cool the walls. There are two highly effective methods of cooling combustor walls, effusion (known by other names such as multi-hole) and impingement.

Effusion cooling is provided by an array of small holes positioned in the combustor liner wall. A supply of cooling air is passed through the holes from the cooler surface of the combustor liner to the surface exposed to higher temperatures. The cooling air actively cools the wall by convection as it passes through the hole and film cooling after the cooling air is discharged.

The effusion holes are typically between about 0.010 and about 0.050 inches in diameter and angled so that the centerline of the hole forms a 15 to 30 degree angle with respect to the surface of the wall. This small angle increases the length of the hole through the wall thus increasing the surface area from which the cooling air can extract heat from the wall material. The small angle also allows the cooling air to enter the combustor nearly parallel to the wall surface so that a cooling film is generated on the inside of the combustor liner.

Impingement cooling is provided by an impingement plate positioned on the cooler side of the combustor wall. The impingement plate has an array of small holes there through and is spaced at a distance from the surface of the wall to provide a gap. A supply of cooling air is passed through the holes to impinge the surface of the wall and thereby extract heat from the wall material. The surface heat transfer patterns can be controlled by the configuration of the hole array to provide additional cooling to hot spots.

It is well know to the industry that combining the two methods (impingement-effusion) can provide significant improvements in cooling efficiency over either method alone. It has been reported that the heat/mass transfer rate for impingement-effusion cooling is approximately 45% to 55% higher than that for impingement cooling alone and about three to four times that for effusion cooling alone. Although the quantitative results may vary with experimental set-up and application, combined impingement-effusion cooling systems may be more efficient than either alone for some applications.

In U.S. Pat. No. 4,695,247, an impingement-effusion method is described. The disclosed combustor is a double wall construction that uses pin fins to provide spacing between the inner and outer walls. The inner wall is provided with effusion holes and the outer wall is provided with impingement holes. Because the inner wall is exposed to higher temperatures than the outer wall, the thermal growth difference between the two walls results in high thermal stresses and poor control of the impingement gap. The high thermal stresses reduce combustor life and the poor gap control reduces impingement cooling efficiency.

A method for reducing the thermal stresses is described in U.S. Pat. No. 6,237,344. The disclosed impingement baffle has integrally formed dimples. The thermal growth difference between the baffle and the hot wall is alleviated by allowing the gap to float. Unfortunately, this also results in gap variations. The impingement efficiency is very sensitive to the gap between the wall and the impingement plate, which is difficult to control because of the difference in radial thermal growth between the impingement plate and the wall. In smaller cavities such as vanes this gap difference is acceptable, but in large diameter combustor walls the gap variation is a significant sacrifice in cooling efficiency.

Many known impingement-effusion methods have included rigidly attaching two structural walls to one another. The rigidly attached hot and cold structural walls result in high thermal stresses and component life limitations. To avoid these stresses, other methods have included floating one of the walls. Floating one of the walls requires some type of seal and the cooling efficiency is very sensitive to leakage that is present in most seals.

A method that does not require floating a wall or rigidly attaching two structural walls is described In U.S. Pat. No. 5,216,886. This method attaches an array of walled liner cells to a liner support structure. Cooling air enters the cells through impingement holes in the liner support. The cooling air exits the cells through holes in the side wall portions, entering the gaps between the cells, or exits the cells through holes in the top portions of the liner cells. The cooling air then sets up a cooling air film across the top portion of the cells. Although this method may avoid the thermal stress and leakage problems mentioned above, it requires multiple walled liner cells, which increases the surface area exposed to the hot combustion gas flow. Additionally, each liner cell must have sharp edges to comply with the hot side flow path, complicating liner manufacturing. Moreover, because the cells expand axially and laterally into the gaps to alleviate the thermal stresses, variations in the momentum of the cooling air that passes through the gaps may result in cooling film disruptions for some applications. Further, a combustor liner comprising multiple liner cells may not be suitable for thermal barrier coating (TBC) applications. Conventional techniques for applying TBC, such as plasma spray, may result in TBC being deposited in the gaps between the liner cells, which in turn may disrupt the flow of cooling air or close the gap that is required for thermal expansion.

As can be seen, there is a need for a method of attaching an impingement plate directly to the combustor in such a manner that will result in acceptable stresses but will have no leakage. Further, there is a need for a method of cooling a combustor liner by impingement-effusion that allows for conventional TBC application. An impingement effusion method is needed wherein thermal stress is relieved without increasing the surface area that is exposed to the high temperature gas flow.

SUMMARY OF THE INVENTION

In one aspect of the present invention, an apparatus for a component comprises a waffled impingement plate having at least one baffle cell, the baffle cell having a top portion and at least three side portions in contact with the top portion such that a cell cavity is formed; and at least one impingement hole positioned in the waffled impingement plate, the impingement hole capable of providing a cooling flow to a cold backside surface of the component.

In another aspect of the present invention, an apparatus for cooling a component comprises a waffled impingement plate conforming to at least a portion of a cold backside surface of the component, the waffled impingement plate comprising at least one baffle cell having at least one impingement hole there through, the baffle cell forming a cell cavity.

In still another aspect of the present invention, an apparatus for a component comprises a waffled impingement plate having at least one cell cavity and having at least one impingement hole there through, the waffled impingement plate conforming to a cold backside surface of said component.

In yet another aspect of the present invention, an apparatus for a component comprises at least one waffled impingement plate comprising a plurality of baffle cells, at least one baffle cell having a top portion with an area of between about 0.04 inch$^2$ and about 9.0 inch$^2$; and at least one impingement hole positioned in said top portion.

In another aspect of the present invention, an apparatus for a combustor liner comprises a waffled impingement plate having a plurality of baffle cells, at least one baffle cell having a top portion and six side portions connected to the top portion, the top portion having an area of less than about 9.0 inch$^2$ and a plurality of impingement holes there through, each side portion having an outer end capable of being rigidly attached to a cold backside surface of the combustor liner.

In a further aspect of the present invention, a method of cooling a component comprises the step of passing a cooling flow through at least one impingement hole of a waffled impingement plate, the waffled impingement plate rigidly attached to a cold backside surface of the component and comprising at least one baffle cell having a cell cavity, the step of passing such that the cooling flow enters the cell cavity, impinges on the cold backside surface and enters an effusion hole of the component.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides waffled impingement effusion cooling for components, such as combustor liners, and methods of cooling the same. The waffled impingement effusion cooling according to the present invention may find beneficial use in many industries including aerospace, automotive, and electricity generation. The present invention may be beneficial in applications including turbine engine combustors for aircraft propulsion, ground transportation, power generation, and auxiliary power generation. This invention may be useful in any impingement-effusion cooled component application.

In one embodiment, the present invention provides a waffled impingement plate for a combustor liner. Unlike the prior art, the impingement plate may comprise a plurality of individual cells to relieve the thermal growth difference between the cold impingement plate and the hot combustor wall. The use of individual impingement plate cells may allow the impingement plate to be rigidly attached to the combustor liner thus eliminating the need for a seal and its inherent problems with leakage. Thermal barrier coating may easily be applied to the liner, unlike prior art methods comprising individual walled liner cells. Thermal stress may be relieved without increasing the surface area exposed to the hot combustion gas flow because the stress relieving cells may be positioned on the backside of the liner as opposed to the hot gas flow side. This is unlike the prior art that relieves thermal stress by placing stress relieving walled liner cells on the hot gas flow side.

Figure 1:
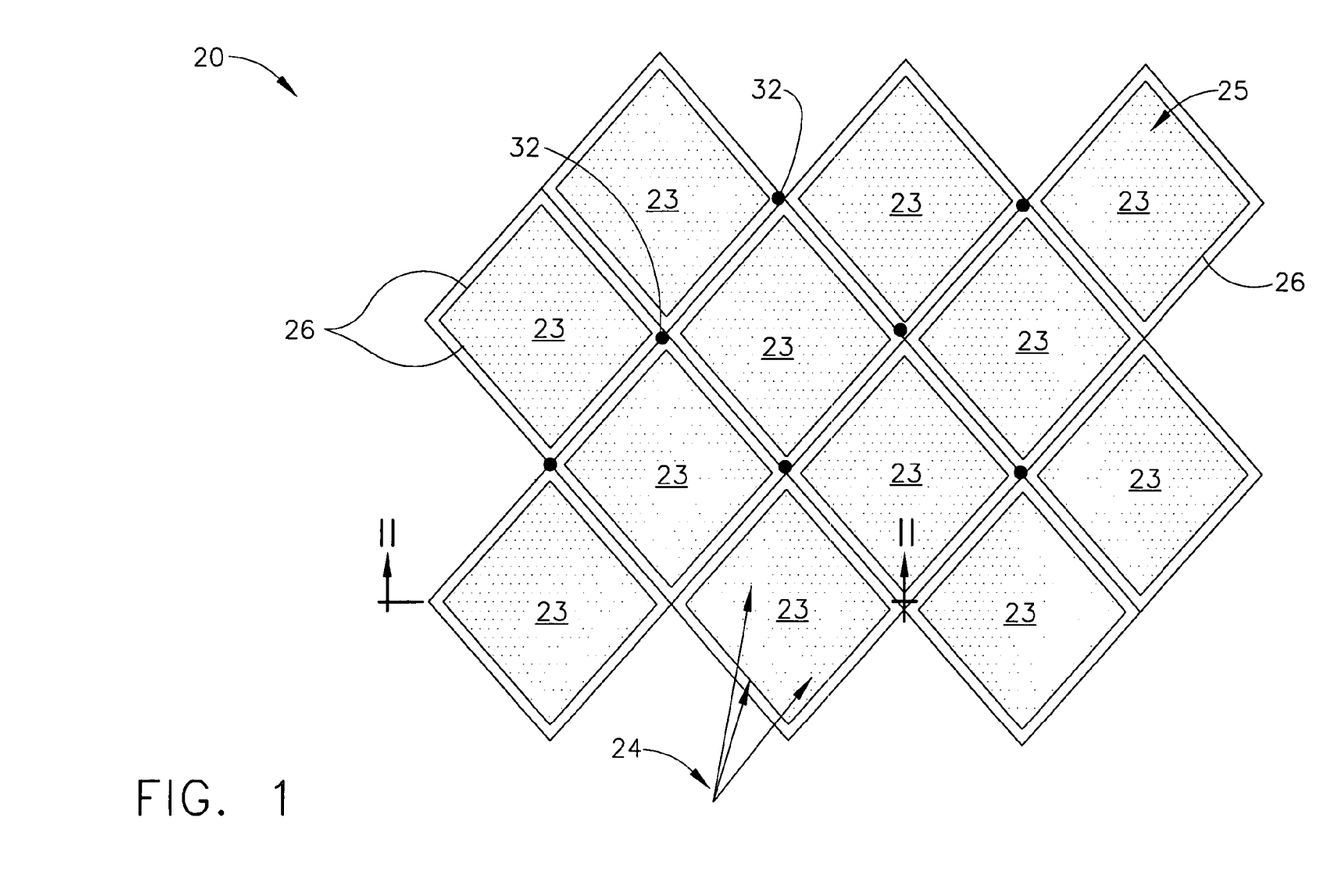
FIG. 1 is a plan view of a waffled impingement plate according to one embodiment of the present invention.
Figure 3:
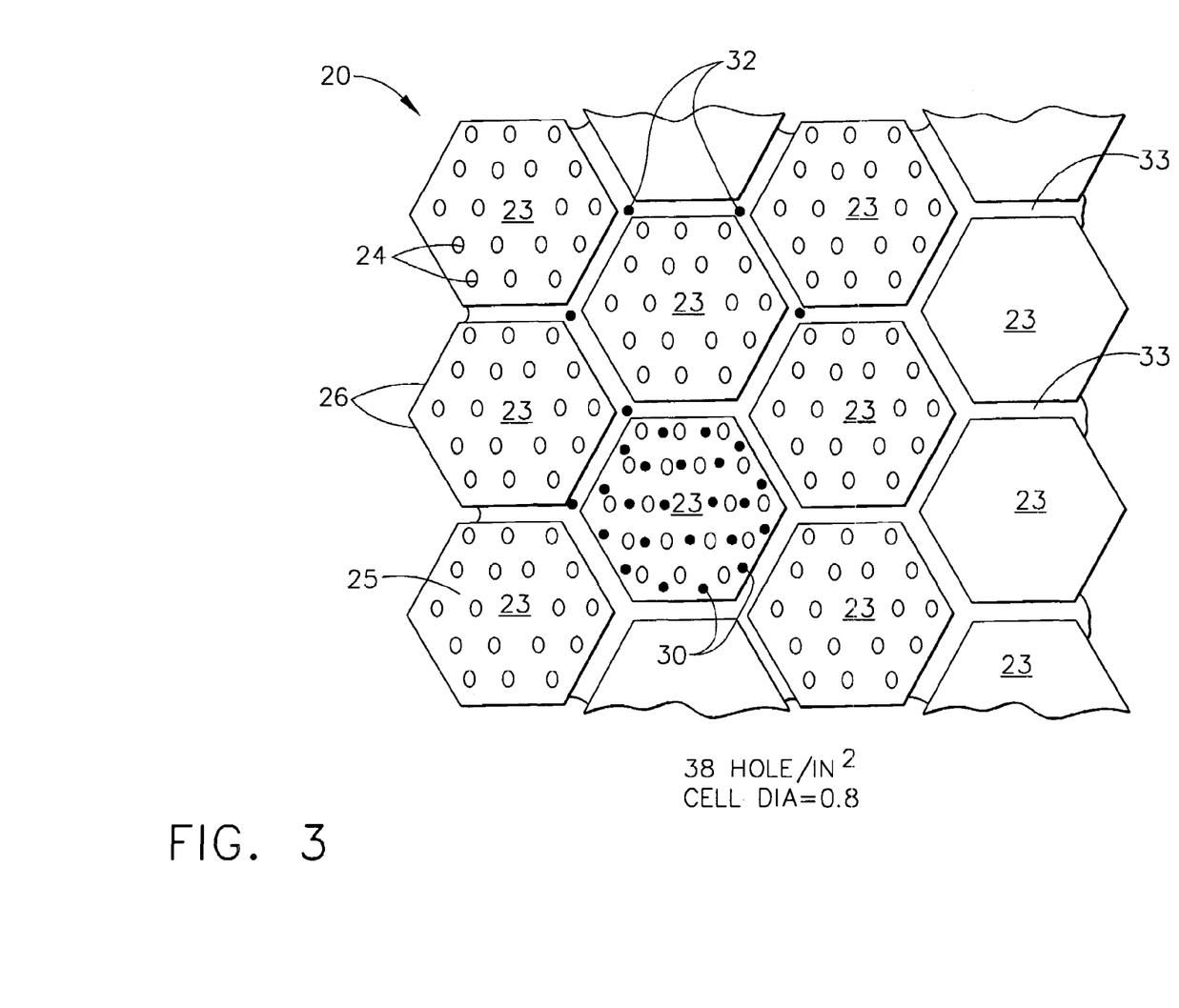
FIG. 3 is a plan view of a waffled impingement plate according to another embodiment of the present invention.

A waffled impingement plate 20 is depicted in FIG. 1. The waffled impingement plate 20 may comprise metal sheet stock. The waffled impingement plate 20 may conform to the contour of at least a portion of the component. The waffled impingement plate 20 may comprise a plurality of baffle cells 23. The shape of the baffle cells 23 may comprise any shape that allows the baffle cells 23 to be nested to cover at least a portion of the component without blocking the effusion holes of the component. As used herein, nested baffle cells may be baffled cells 23 positioned such that the sides of adjacent baffle cells 23 may be about parallel to one another, as depicted in FIGS. 1 and 3. In other words, nested baffle cells may be baffle cells 23 that "fit together", similar to the gridlike indented pattern of a waffle. The shape of the baffle cell 23 may include square, diamond, hexagon, and others. For example, square shaped baffle cells 23 are depicted in FIG. 1 and hexagon shaped baffle cells 23 are depicted in FIG. 3. A waffled impingement plate 20 may comprise baffle cells 23 comprising one or more than one shape. For example, a waffled impingement plate 20 may comprise hexagon shaped baffle cells 23 or both diamond and triangle shaped baffle cells 23. The baffle cells 23 may be formed by known methods, such as stamping and hydroforming. The waffled impingement plate 20 may comprise at least one baffle cell 23.

Figure 2:
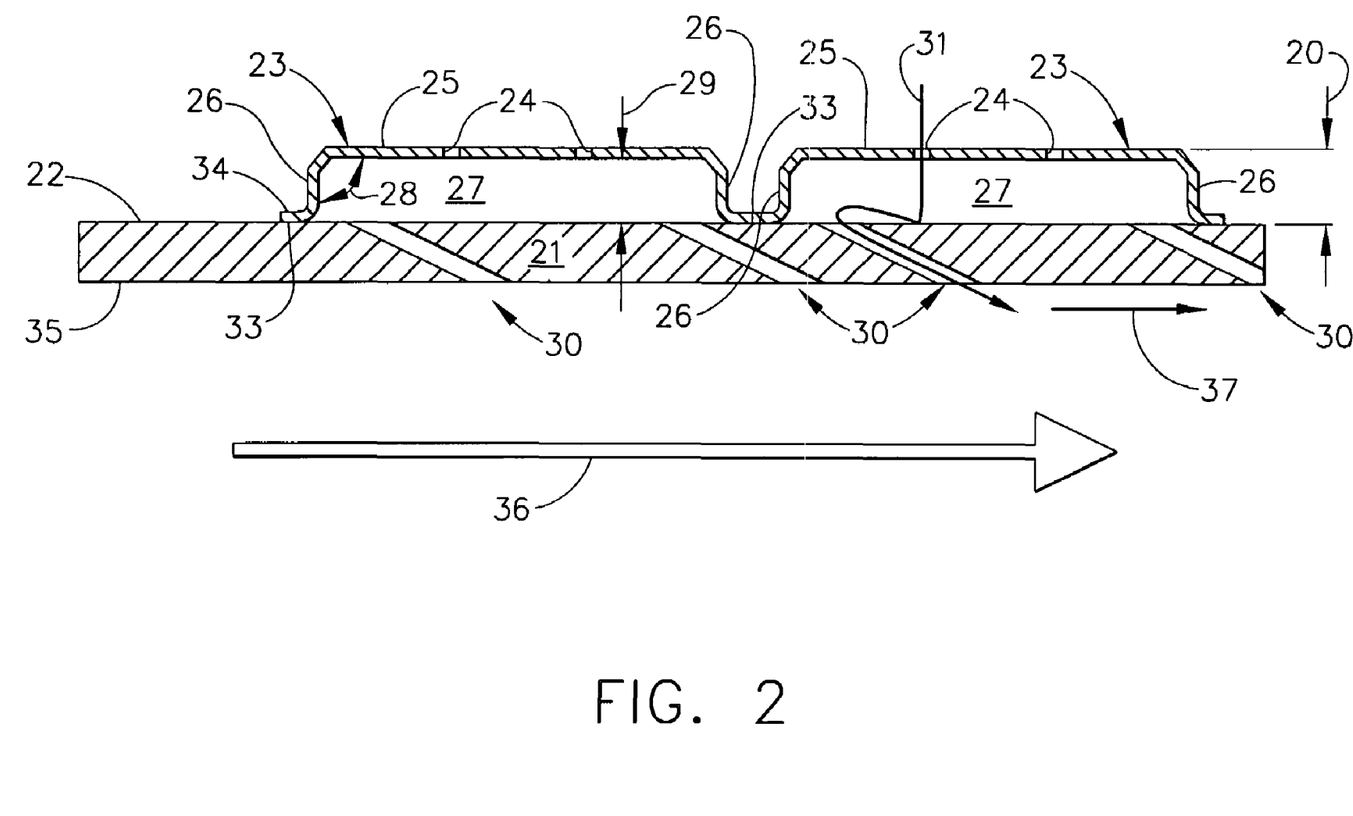
FIG. 2 is a cross-sectional view along line II of FIG. 1.

A baffle cell 23, as better seen in FIG. 2, may comprise a top portion 25 and a plurality of side portions 26 in contact with the top portion 25. The baffle cell 23 may comprise at least three side portions 26 such that a cell cavity 27 (impingement gap) is formed. A cell cavity 27 may be a recess defined by the top portion 25 and side portions 26 of the baffle cell 23. The side portions 26 may be at an angle 28 of at least about 90° relative to the top portion 25. For some applications, the side portions 26 may be slanted due to sheet metal stamping limitations and the baffle cell 23 may resemble a truncated pyramid. For example, the angle 28 may be about 95° relative to the top portion 25 such that the side portions 26 slant outward. The angle 28 may depend on factors including manufacturing limitations, sheet stock dimensions and sheet stock composition. For some applications, the area of the top portion 25 may be between about 0.04 inch$^2$ and about 9.0 inch$^2$. The dimensions of the baffle cell 23 may include any dimensions that are capable of relieving thermal stress between the waffled impingement plate 20 and the component.

The baffle cell 23 may have at least one impingement hole 24 there through such that a cooling flow 31 may enter the cell cavity 27 and impinge on a cold backside surface 22 of the component. FIG. 2 depicts two baffle cells 23 in contact with the cold backside surface 22 of a portion of a combustor liner 21. The cold backside surface 22 may be the surface of a component that is away from a hot gas flow 36, such as combustion gases, and a hot side 35 may be the surface of a component that is exposed to the hot gas flow 36.

The number of impingement holes 24 may vary. The number of impingement holes 24 may depend on factors including application, the shape of the baffle cell 23, the diameter of the impingement hole 24, and the area of the baffle cell 23. For example, for a hexagon shaped baffle cell 23 for use in an annular combustor liner application, there may be about fourteen impingement holes 24, each having a diameter of about 0.025 inches. For some applications, the impingement hole 24 may have a diameter between about 0.01 and about 0.05 inches. The diameter of the impingement hole 24 may vary and may depend on factors including the application, the number of impingement holes 24, the shape of the baffle cell 23, and the cavity height 29. The cavity height 29 (impingement distance) may be the distance between an impingement hole 24 and a cold backside surface 22 of a component, such as combustor liner 21. For some applications, the cavity height 29 may be about three times the diameter of the impingement hole 24. For example, for a baffle cell 23 having a cavity height 29 of about 0.060 inches, the diameter of the impingement hole 24 may be about 0.020 inches. The impingement holes 24 may be formed by conventional drilling techniques, such as electrical-discharge machining (EDM) and laser machining.

The impingement holes 24 may be positioned and sized for optimal heat transfer with minimal cross flow degradation. Any known method of heat transfer analysis may be useful. Factors affecting impingement cooling effectiveness may include the rate of flow of the cooling flow 31, cross flow degradation, impingement distance (cavity height 29), and the diameter of the impingement holes 24. Cross flow degradation may be due to the spent air interfering with the intended impingement surfaces while the spent air exits the cell cavity 27. During operation, the cooling flow 31 may exit the cell cavity 27 through effusion holes 30 positioned in the component.

Figure 4:
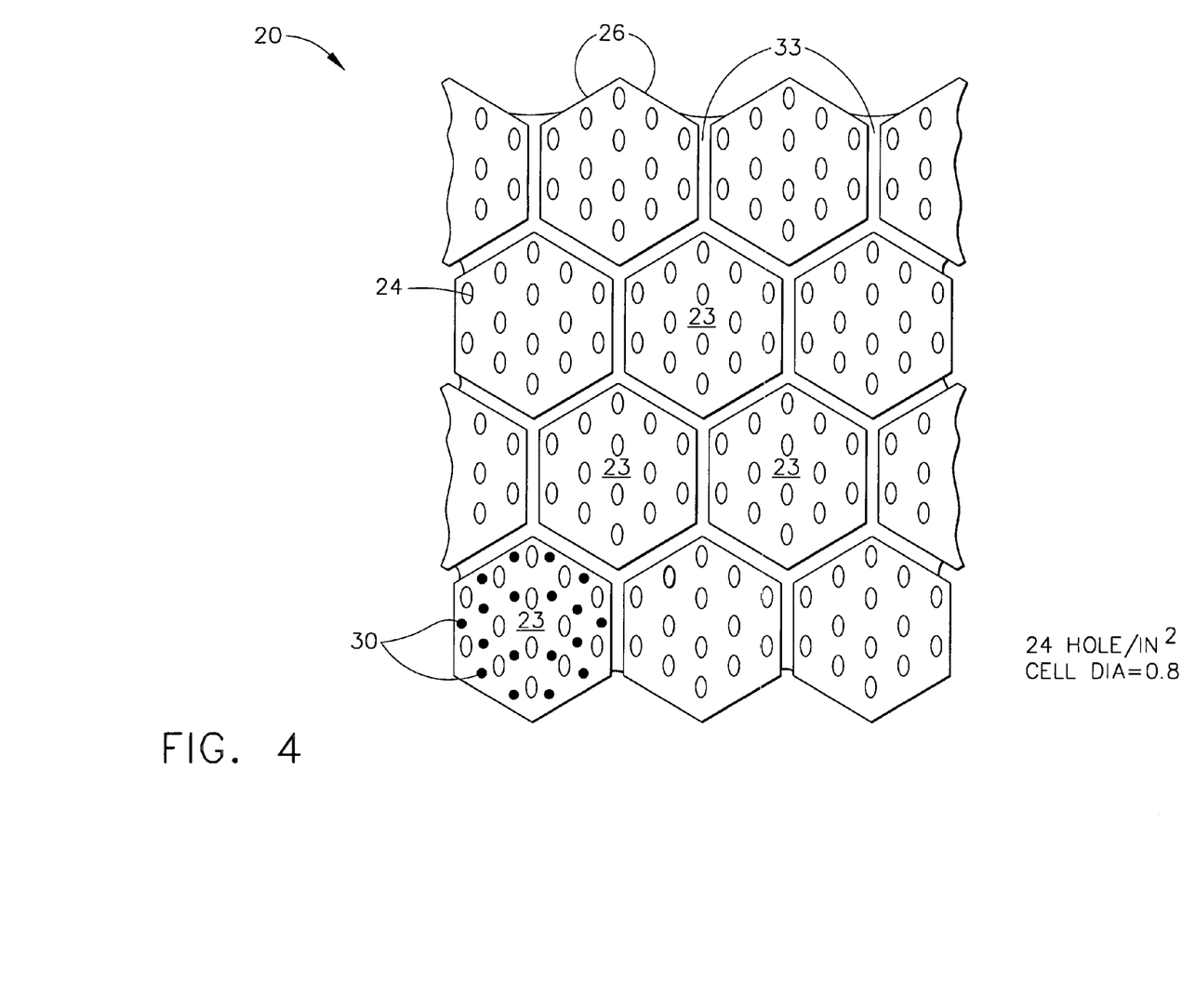
FIG. 4 is a plan view of a waffled impingement plate according to a third embodiment of the present invention.

The component may have a plurality of effusion holes 30 there through. The effusion holes 30 may be formed by conventional drilling techniques such as electrical-discharge machining (EDM), stationary percussion laser machining and percussion on-the-fly laser drilling or with complex casting techniques. The effusion holes 30 may be angled with respect to the cold-backside surface 22 such that a cooling flow 31 through the effusion holes 30 may provide a cooling film 37 on the hot side 35. For some applications, the effusion hole 30 and the cold backside surface 22 of the combustor liner 21 may form an angle (not shown) of between about 15° and about 30°. The diameter of an effusion hole 30 may vary with application and may depend on factors including the number and diameter of the impingement holes 24. For some applications, the effusion hole 30 may have a diameter between about 0.01 and about 0.05 inches. The effusion hole 30 may comprise any known effusion hole shape, such as cylindrical and tapered. The number of effusion holes 30 may vary and may depend on factors including the diameter of the impingement holes 24, the number of impingement holes 24, the temperature of the hot gas flow 36, and the dimensions and composition of the component. The density of the effusion holes 30 may vary with application and may depend on factors including the dimensions and composition of the component, the velocity of the cooling flow 31, the temperature of the hot gas flow 36, and the density of the impingement holes 24. For example, a hexagon shaped baffle cell 23, having a diameter of about 0.8 inch and nineteen impingement holes 24 there through, may be positioned over about twenty-two effusion holes 30, as seen in FIG. 3. In FIGS. 3 and 4, the effusion holes 30 are depicted for placement purposes only. The effusion holes 30 are positioned in a component (not seen in these figures), not in the baffle cell 23 as these figures appear to suggest. FIG. 4 also depicts a 0.8 inch diameter baffle cell 23, but with fourteen impingement holes 24 and eighteen effusion holes 30. For some combustor applications, the density of the effusion holes 30 may be between about 10 and about 100 holes/in$^2$.

The component, such as but not limited to combustor liner 21, may comprise any component exposed to high temperatures. Useful components may include gas turbine engine components, for example combustors, vanes and shrouds. The component may comprise a metal or a metal alloy, such as HA230™ and HA188™ available from Haynes International. The component may comprise a component having a TBC (not shown) applied to the hot side 35. For example, a TBC comprising Zircoat™ (available from PRAXAIR) may be deposited by plasma spray technique prior to effusion hole 30 formation. Any TBC composition, TBC application technique, and effusion hole formation technique may be useful with the present invention. The TBC may provide thermal insulation against the hot gas flow 36 and may reduce the cooling requirement of the component.

One or more than one waffled impingement plate 20 may be attached to the component. For example, for an application wherein the component has a cold back-side surface 22 of about 100 in$^2$ and the baffle cells 23 each have a top portion 25 of about 1.0 in$^2$, one waffled impingement plate 20 having about one hundred baffle cells 23 may be attached to the component. Alternatively, ten waffled impingement plates 20, each having about ten baffle cells 23 may be attached to the component. For another alternative, about one hundred waffled impingement plates 20, each having one baffle cell 23 may be attached to the component. The number of waffled impingement plates 20 may vary and may depend on manufacturing preference.

The waffled impingement plate 20 may be positioned on the cold backside surface 22 of a component such that a cooling flow 31 through an impingement hole 24 of the waffled impingement plate 20 is capable of impinging on the cold back-side surface 22 and entering an effusion hole 30 of the component. The waffled impingement plate 20 may be attached such that blockage of the effusion holes 30 is avoided. In other words, the waffled impingement plate 20 may be positioned such that it covers at least a portion of the component but does not block the effusion holes 30.

The waffled impingement plate 20 may be rigidly attached to the cold backside surface 22 of the component. For example, the waffled impingement plate 20 may be held in place by tacking or spot-welding and then brazed, E-Beam welded or Laser welded to the cold back-side surface 22. For some applications, at least one alloying hole 32 may be positioned in the waffled impingement plate 20, as seen in FIGS. 1 and 3. Alloying holes 32 are known in the art and may facilitate brazing. Alloying holes 32 may allow braze material (not shown) to be wicked onto the contact areas 33. The contact areas 33, depicted in FIG. 2, may be the portions of the waffled impingement plate 20 that are in contact with the cold backside surface 22. A contact area 33 may comprise an outer end 34 of a side portion 26 of a baffle cell 23. The outer end 34 may be the end of a side portion 26 that is furthest from the top portion 25. The waffle impingement plate 20 may be attached to the component by brazing the contact areas 33. The waffle impingement plate 20 may be attached to the component by welding the contact areas 33.

Figure 5:
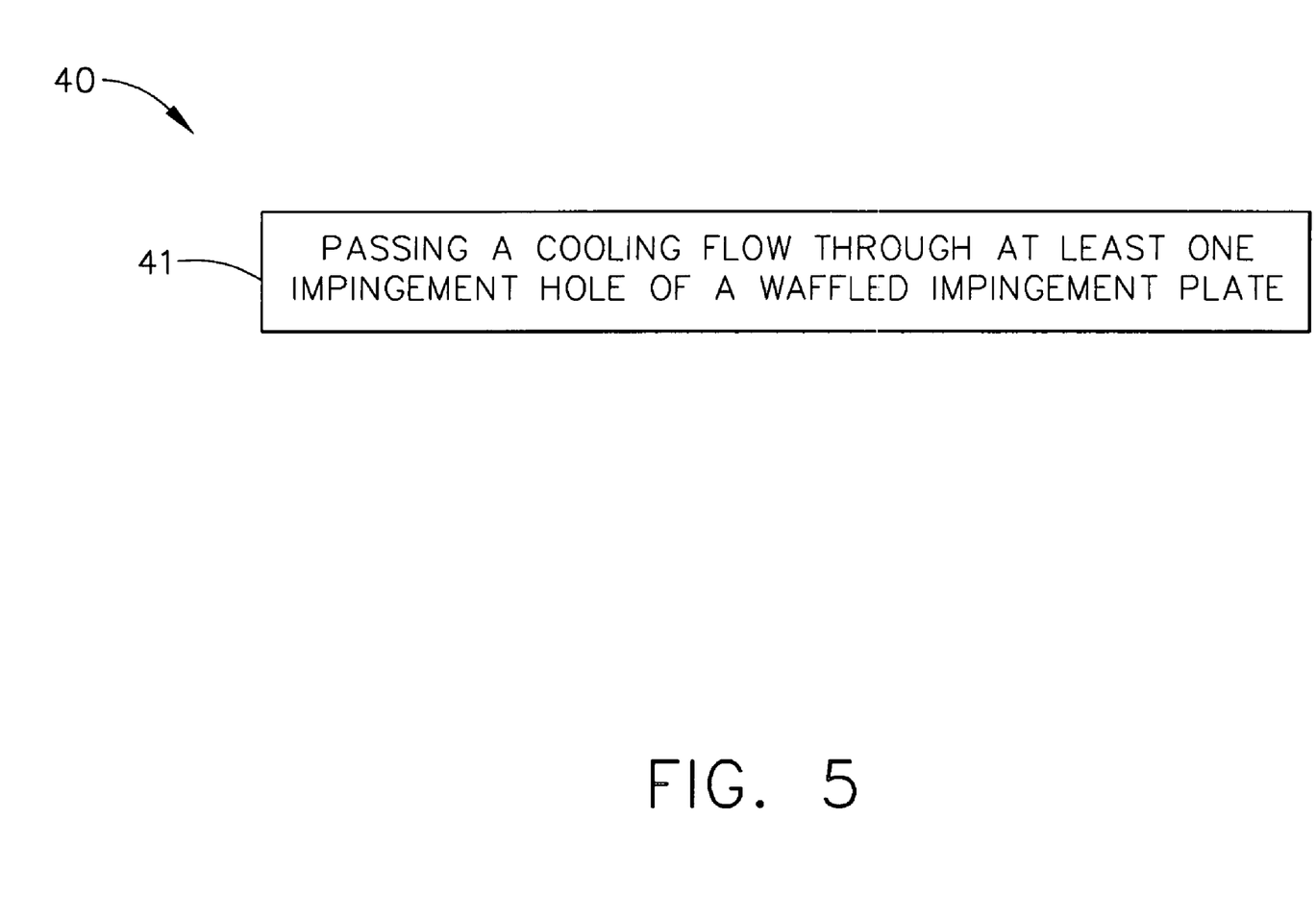
FIG. 5 is a flow chart of a method of waffled impingement effusion cooling for a component according to an embodiment of the present invention.

A method 40 of waffled impingement effusion cooling for a component is depicted in FIG. 5. The method 40 may comprise a step 41 of passing a cooling flow 31 through at least one impingement hole 24 of a waffled impingement plate 20. The cooling flow 31 may be passed such that the cooling flow 33 enters a cell cavity 27 and impinges on a cold backside surface 22 of the component. The impingement hole 24 may be in flow communication with at least one effusion hole 30 of the component. The cooling flow 33 may exit the cell cavity 27 through the effusion hole(s) 30 of the component. The cooling flow 33 may exit the cell cavity 27, providing convective cooling inside the effusion hole 30 and a cooling film 37 on the hot side 35 of the component.

As can be appreciated by those skilled in the art, the present invention provides improved impingement effusion methods. Seals and their inherent leakage problems are eliminated by rigidly attaching the impingement plate to the component. Thermal stress is alleviated by the small sized baffle cells of the impingement plate.

It should be understood, of course, that the foregoing relates to exemplary embodiments of the invention and that modifications may be made without departing from the spirit and scope of the invention as set forth in the following claims.

I claim:

1. An apparatus for a component comprising:
   a waffled impingement plate having at least one baffle cell, said baffle cell having a top portion and at least three side portions in contact with said top portion such that a cell cavity is formed; and
   at least one impingement hole positioned in said waffled impingement plate, said impingement hole capable of providing a cooling flow to a cold backside surface of said component.

2. The apparatus of claim 1, wherein said top portion has an area of less than about 9.0 inch$^2$.

3. The apparatus of claim 1, wherein said impingement hole is in flow communication with an effusion hole of said component.

4. The apparatus of claim 1, wherein said waffled impingement plate comprises a plurality of hexagon shaped baffle cells.

5. The apparatus of claim 1, wherein said waffled impingement plate comprises at least one square shaped baffle cell having a plurality of impingement holes there through.

6. The apparatus of claim 1, wherein said waffled impingement plate conforms tote contour of at least a portion of said cold backside surface.

7. The apparatus of claim 1, wherein said waffled impingement plate comprises a plurality of nested baffle cells.

8. The apparatus of claim 1, wherein said component comprises a combustor liner.

9. The apparatus of claim 1, wherein said top portion has an area of between about 0.04 inch$^2$ and about 9.0 inch$^2$.

10. The apparatus of claim 1, wherein said waffled impingement plate comprises at least one alloying hole there through.

11. An apparatus for cooling a component comprising:
    a waffled impingement plate conforming to at least a portion of a cold backside surface of said component, said waffled impingement plate comprising at least one baffle cell having at least one impingement hole there through, said baffle cell forming a cell cavity and comprising a top portion and at least three side portions in contact with said top portion, each side portion having an outer end.

12. The apparatus of claim 11, wherein a height of said cell cavity is about three times a diameter of said impingement hole.

13. The apparatus of claim 11, wherein said top portion has an area of less than about 9.0 inch$^2$.

14. The apparatus of claim 11, wherein at least one outer end is capable of being brazed to said cold backside surface.

15. The apparatus of claim 11, wherein said top portion has an area of between about 0.04 inch$^2$ and about 9.0 inch$^2$.

16. The apparatus of claim 11, wherein said baffle cell comprises six side portions.

17. The apparatus of claim 11, wherein said waffled impingement plate is capable of providing a cooling film on a hot side of said component.

18. The apparatus of claim 11, wherein said component comprises a combustor.

19. An apparatus for cooling a component comprising:
    a waffled impingement plate conforming to at least a portion of a cold backside surface of said component, said waffled impingement plate comprising at least one baffle cell having at least one impingement hole there through, said baffle cell forming a cell cavity and having at least four outer ends capable of being attached to said cold backside surface.

20. An apparatus for a component comprising: a waffled impingement plate having at least one cell cavity and having at least one impingement hole there through, said waffled impingement plate conforming to a cold backside surface of said component and comprising a plurality of baffle cells, each baffle cell having a hexagon shaped top portion.

21. The apparatus of claim 20, wherein said waffled impingement plate further comprises a plurality of alloying holes.

22. The apparatus of claim 20, wherein said waffled impingement plate further comprises a sheet metal.

23. The apparatus of claim 20, wherein a height of said cell cavity is about three times a diameter of said impingement hole.

24. The apparatus of claim 20, wherein said component further comprises an annular combustor liner.

25. The apparatus of claim 20, wherein said component further comprises a can combustor.

26. An apparatus for a combustor liner comprising: a waffled impingement plate having a plurality of baffle cells, at least one baffle cell having a top portion and six side portions connected to said top portion, said top portion having an area of less than about 9.0 inch$^2$ and a plurality of impingement holes there through, each side portion having an outer end capable of being attached to a cold backside surface of said combustor liner.

27. A method of cooling a component comprising the step of: passing a cooling flow through at least one impingement hole of a waffled impingement plate, said waffled impingement plate attached to a cold backside surface of said component and comprising at least one baffle cell having a cell cavity and comprising a top portion and at least three side portions in contact with said top portion, each side portion having an outer end, said step of passing such that said cooling flow enters said cell cavity, impinges on said cold backside surface and enters an effusion hole of said component.

28. The method of claim 27, wherein said step of passing provides a cooling film to a hot side of said component.

29. The method of claim 27, wherein said waffled impingement plate is brazed to said cold backside surface.

30. The method of claim 27, wherein said waffled impingement plate is welded to said cold backside surface.

31. The method of claim 27, wherein at least one said baffle cell has a top portion with an area of less than about 9.0 inch$^2$.

* * * * *